US012769352B2

(12) United States Patent
Escher et al.

(10) Patent No.: US 12,769,352 B2
(45) Date of Patent: Oct. 20, 2026

(54) ACTUATION DEVICE, MOTOR VEHICLE

(71) Applicant: Robert Bosch GmbH, Stuttgart (DE)

(72) Inventors: Guenter Escher, Oberstdorf (DE); Eduard Maiterth, Heilbronn (DE); Manfred Fischer, Oppenweiler (DE); Matthias Maidel, Buchenberg (DE); Simon Baumann, Heilbronn (DE); Stefan Weller, Rauenberg (DE); Timo Knecht, Mundelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 5 days.

(21) Appl. No.: 19/048,879

(22) Filed: Feb. 8, 2025

(65) Prior Publication Data

US 2025/0264903 A1 Aug. 21, 2025

(30) Foreign Application Priority Data

Feb. 15, 2024 (DE) ..................... 10 2024 201 375.7

(51) Int. Cl.
*G05G 1/42* (2008.04)
*G05G 25/04* (2006.01)

(52) U.S. Cl.
CPC ............... *G05G 1/42* (2013.01); *G05G 25/04* (2013.01); *G05G 2505/00* (2013.01)

(58) Field of Classification Search
CPC ....... G05G 1/42; G05G 25/04; G05G 2505/00
See application file for complete search history.

(56) References Cited

U.S. PATENT DOCUMENTS 7,066,049 B2 * 6/2006 Reimann ................ B60K 26/02 74/513
8,376,098 B2 * 2/2013 Campbell ............ B60K 26/021 188/265
9,945,473 B2 * 4/2018 Viethen ................... F16H 59/20

FOREIGN PATENT DOCUMENTS

DE 10 2019 004 525 A1 1/2021
DE 10 2022 212 450 A1 5/2024
DE 10 2022 212 470 A1 5/2024

* cited by examiner

*Primary Examiner* — Vicky A Johnson
(74) *Attorney, Agent, or Firm* — Maginot, Moore & Beck LLP

(57) ABSTRACT

An actuation device for a motor vehicle, in particular for specifying a braking and/or acceleration request is disclosed. The actuation device has a first housing portion and a second housing portion. The first housing portion is displaceably mounted on the second housing portion in the longitudinal extension of the second housing portion. The first housing portion has an actuating surface on a top surface facing away from the second housing portion, or a cover having an actuating surface is arranged on a top surface facing away from the second housing portion. The housing portions are each formed at least in sections in a cylindrical shape with a closed casing wall. The actuation device further has a first sliding element and a second sliding element arranged between the housing portions. The first sliding element and the second sliding element each abut axially against at least one of the housing portions. The actuation device further includes at least one spring element, in particular a coil spring, arranged as a return spring, pretensioned axially, in particular coaxially with the housing portions in order to urge the housing portions into an unactuated rest position.

18 Claims, 6 Drawing Sheets

ACTUATION DEVICE, MOTOR VEHICLE

This application claims priority under 35 U.S.C. § 119 to patent application no. DE 10 2024 201 375.7, filed on Feb. 15, 2024 in Germany, the disclosure of which is incorporated herein by reference in its entirety.

The disclosure relates to an actuation device for a motor vehicle, in particular for indicating a braking and/or acceleration request, having a first housing portion and having a second housing portion, wherein the first housing portion is displaceably mounted on the second housing portion in the longitudinal extension of the second housing portion, and wherein the first housing portion has an actuating surface on a top surface facing away from the second housing portion, or wherein a cover having an actuating surface is arranged on a top surface facing away from the second housing portion. In addition, the disclosure relates to a motor vehicle having one such actuation device.

BACKGROUND

From the prior art, it is known to detect an actuation of an actuation device for a motor vehicle which can be actuated by a driver using a sensor assigned to the actuation device. If the driver actuates the actuation device, a braking or acceleration request of the driver is in particular detected as a function thereof. For example, brake systems with electromechanical brake amplifiers are known that, together with a vehicle assistance system, in particular an electronic stability program (ESP), form a redundant brake-by-wire system, in which there is no mechanical connection from the actuation device to the brake system. A braking request is forwarded, for example, as a function of an actuation of the actuation device to an electromechanical actuator which is designed to carry out a pressure build-up in the braking system.

Analogously, actuation devices for drive units, in particular with internal combustion engines and/or electric motors, are known from motor vehicles which are part of a drive-by-wire system without a mechanical connection to the drive unit. For example, an acceleration request is detected as a function of an actuation of the actuation device and forwarded to the drive unit. Due to the lack of mechanical coupling of the actuation devices to the brake system and/or the drive unit, it is possible to design such actuation devices which are stroke-free or with at least a low stroke of a few millimeters. The use of different measurement methods is known for detecting the actuation.

For example, the applicant's application DE 10 2022 212 470.7, which has not yet been published, discloses an actuation device in accordance with the genus, which comprises a first and a second housing portion, wherein the first housing portion is displaceably mounted on the second housing portion in the height extension of the second housing portion, wherein the first housing portion has an actuating surface on a top surface facing away from the second housing portion or wherein a cover with the actuating surface is arranged on the top surface, wherein a sensor arrangement for detecting an actuation of the actuation device, in particular an actuating force exerted on the actuating surface, and wherein a partition is formed or arranged in the second housing portion, which forms a chamber with the second housing portion, in order to enclose at least one component of the sensor arrangement in a media-tight manner.

From the applicant's application DE 10 2022 212 450.2, which has also not yet been published, a matching sensor arrangement is known which has a force transmission element, in particular assignable or assigned to the actuating surface of the actuation device, for transmitting an actuating force exerted on the actuation device, in particular on the actuating surface, and a measuring head arranged in a circuit board, wherein the measuring head has a measuring membrane, and wherein the measuring membrane has a force sensor element at one end and is assigned to the force transmission element at the other end.

SUMMARY

The actuation device according to the disclosure is characterized in that the housing portions are each formed at least in sections in a cylindrical shape with a closed casing wall, that a first sliding element and a second sliding element are arranged between the housing portions, the first sliding element and the second sliding element each abut axially against at least one of the housing portions, and at least one spring element, in particular a coil spring, is arranged as a return spring, pretensioned axially, in particular coaxially with the housing portions, in order to urge the housing portions into an unactuated rest position. In this respect, the sliding elements perform an advantageous dual function. On the one hand, they ensure that the housing portions are displaceable relative to each other with little friction, and on the other hand, they securely lock the spring element in its position. In this respect, the actuation device according to the disclosure has, in contrast to the aforementioned actuation device of the applicant, in particular the two sliding elements with the spring element arranged therebetween. The shape of the housing portions also differs: in the prior art, they have a rather rectangular or trapezoidal cross-section, whereas the disclosure provides a cylindrical design, at least in sections, in particular with a circular cross-section. In particular, at least one of the housing portions has a different inner diameter and/or outer diameter in each of the areas associated with the sliding elements, so that a particularly advantageous stepped guide is realized overall by the sliding elements.

According to a preferred embodiment of the disclosure, it is provided that one of the sliding elements, in particular the first sliding element, is displaceable along the longitudinal extension of the second housing portion together with the first housing portion relative to the second housing portion, and/or that one of the sliding elements, in particular the second sliding element, is arranged in a stationary position on the second housing portion and the first housing portion is displaceable along the longitudinal extension of the second housing portion relative to the sliding element. In this respect, each sliding element is preferably arranged in a stationary position on exactly one of the housing portions, or moves with exactly one of the housing portions. Such a design and arrangement of the sliding elements is advantageous in ensuring that the housing portions are displaceable relative to one another with little friction. If, for example, the first sliding element is displaceable together with the first housing portion relative to the second housing portion, then the sliding element accordingly supports the first housing portion as the outer housing shell, which can move relative to the second housing portion as the inner housing shell. In particular, the sliding elements have different inner diameters and/or outer diameters. Preferably, at least one of the sliding elements is cylindrical or pot-shaped so that it is securely fixed in position relative to one of the housing portions.

It is particularly preferred that at least one of the sliding elements, in particular the first and the second sliding element, respectively, abuts against an inner side of the first housing portion by way of a first surface and/or abuts against an outer side of the second housing portion by way of a second surface, in particular the surface facing away from the first surface. This has the advantage that the sliding element is arranged in a planar manner between the two housing portions and the sliding effect is maximized, and it is ensured that the housing portions do not rub directly against one another, but that the respective sliding element is always arranged therebetween. In this case, a corresponding sliding effect is produced in particular between the first surface and the inner side of the first housing portion or between the second surface and the outer side of the second housing portion.

According to a preferred embodiment of the disclosure, it is envisaged that the first housing portion has a first inner diameter in a first region associated with the first sliding element and has a second inner diameter in a second region associated with the second sliding element, which second inner diameter is greater than the first inner diameter. The different inner diameters result in a particularly advantageous stepped guidance of the housing portions on one another.

It is particularly preferred that the second housing portion has a first outer diameter in a first region associated with the first sliding element and has a second outer diameter in a second region associated with the second sliding element, which second outer diameter is greater than the first outer diameter. The different outer diameters result in a particularly advantageous stepped guidance of the housing portions on one another. In particular, the sliding elements and/or housing portions have an at least substantially constant material thickness, so that a ratio of the different outer diameters corresponds at least substantially to a ratio of the different inner diameters mentioned above.

According to a preferred embodiment of the disclosure, it is provided that the sliding elements are each at least essentially cylindrical in shape and have an outer diameter corresponding to the respective inner diameter of the first housing portion and/or an inner diameter corresponding to the respective outer diameter of the second housing portion. This advantageously ensures that the respective sliding element and the respective housing portion are securely held against each other or slide off each other with little friction.

It is particularly preferred that the spring element is configured as a coil spring and has an inner diameter corresponding to the first outer diameter. This has the advantage that the spring element is designed to fit the geometry of the housing portion and is arranged to surround or enclose the latter in some areas. The spring element is then pushed onto the housing portion to that extent and is held in an interlocking manner in the radial extent of the housing portion. In the axial extent, the spring element is then held by the sliding elements accordingly.

According to a preferred embodiment of the disclosure, it is provided that one of the sliding elements, in particular the first sliding element, has a circumferential radial protrusion, and in that the spring element abuts, at least in certain regions, against a surface of the protrusion facing the other of the sliding elements, in particular the second sliding element, by way of a first end, and/or that one of the sliding elements, in particular the second sliding element, has an end side having an opening with a diameter corresponding to the first outer diameter for the first region of the second housing portion and the spring element abuts, at least in certain regions, against a surface of the end side facing the other of the sliding elements, in particular the first sliding element, by way of a second end facing away particularly from the first end. The fact that the spring element abuts against the protrusion and/or the end side is advantageous in ensuring that the spring element is securely fixed between the sliding elements. The spring element is then advantageously secured in an interlocking manner in the radial and axial extent of the housing portion, in particular in connection with the aforementioned sliding on of the second housing portion.

It is particularly preferred that at least one first pin arranged in an opening of the first housing portion and protruding in the direction of the second housing portion, is arranged on the first housing portion, in particular on a circumferential radial protrusion, as an anti-rotation device, which first pin is introduced into an opening, corresponding to its outer contour, of the second housing portion, in particular an opening arranged in a circumferential radial protrusion. The advantage of such an anti-rotation device is that the housing portions are securely fixed and aligned relative to each other, and that the only degree of freedom of movement is the displacement in the axial extension of the housing portions.

According to a preferred embodiment of the disclosure, it is provided that the first pin is arranged in an opening in the second housing portion, and in that, on the first pin, on its end region facing away from the first housing portion an axial stop, in particular a press sleeve surrounding the pin circumferentially, is arranged on the first pin for limiting a stroke of the housing portions relative to each other and/or for adjusting a pretensioning of the spring element. This creates a geometrically particularly advantageous and simple option for stroke limitation and preload adjustment by appropriately positioning the axial stop.

It is particularly preferred that at least one second pin, in particular a second pin arranged in an opening in the second housing portion and protruding in the direction of the first housing portion, is arranged on the second housing portion, in particular on a circumferential radial protrusion, for adjusting a stroke of the housing portions relative to each other. The advantage of using a corresponding pin is that the stroke can be easily adjusted as a function of the length and/or insertion depth of the pin.

According to a preferred embodiment of the disclosure, it is provided that at least one of the pins is formed in one piece with the corresponding housing portion or is connected to the corresponding housing portion in an interlocking, force-fit and/or materially bonded manner, in particular glued, welded and/or pressed and/or screwed into a corresponding opening. This is an advantage in ensuring that the respective pin is designed or connected to the housing portion in a particularly secure and simple manner.

It is particularly preferred that a circumferential sealing element, in particular a bellows-like sealing element is arranged between the first and the second housing portion for sealing against a region outside the housing portions, in particular in each case in regions on a circumferential radial or axial protrusion of the respective housing portion. The advantage of the corresponding sealing element is that the corresponding region between the housing portions is protected from environmental influences.

According to a preferred embodiment of the disclosure, a sensor module for detecting an actuation of the actuation device, in particular an actuating force exerted on the actuating surface and/or an actuation path of the actuating surface, is arranged in the second housing portion. This type of sensor module provides a particularly advantageous and simple way of detecting the actuation. In particular, the sensor module is inserted into the second housing portion as a pre-assembly group.

The motor vehicle with the features set forth below is characterized by at least one actuation device according to the disclosure. The advantages specified hereinabove are achieved as a result. For example, a motor vehicle is provided that has two such actuation devices: one for indicating a braking request, i.e. as a brake pedal, and one for indicating an acceleration request, i.e. as an accelerator pedal. Alternatively, a motor vehicle is provided that has an actuation device of this kind for indicating a braking and acceleration request, i.e. as a combined accelerator pedal. This also results in the advantages specified hereinabove.

BRIEF DESCRIPTION OF THE DRAWINGS

Further preferred features and combinations of features result from the previous description and from the claims. The disclosure is explained in more detail below with reference to the drawings. Shown are:

DETAILED DESCRIPTION

Figure 1:
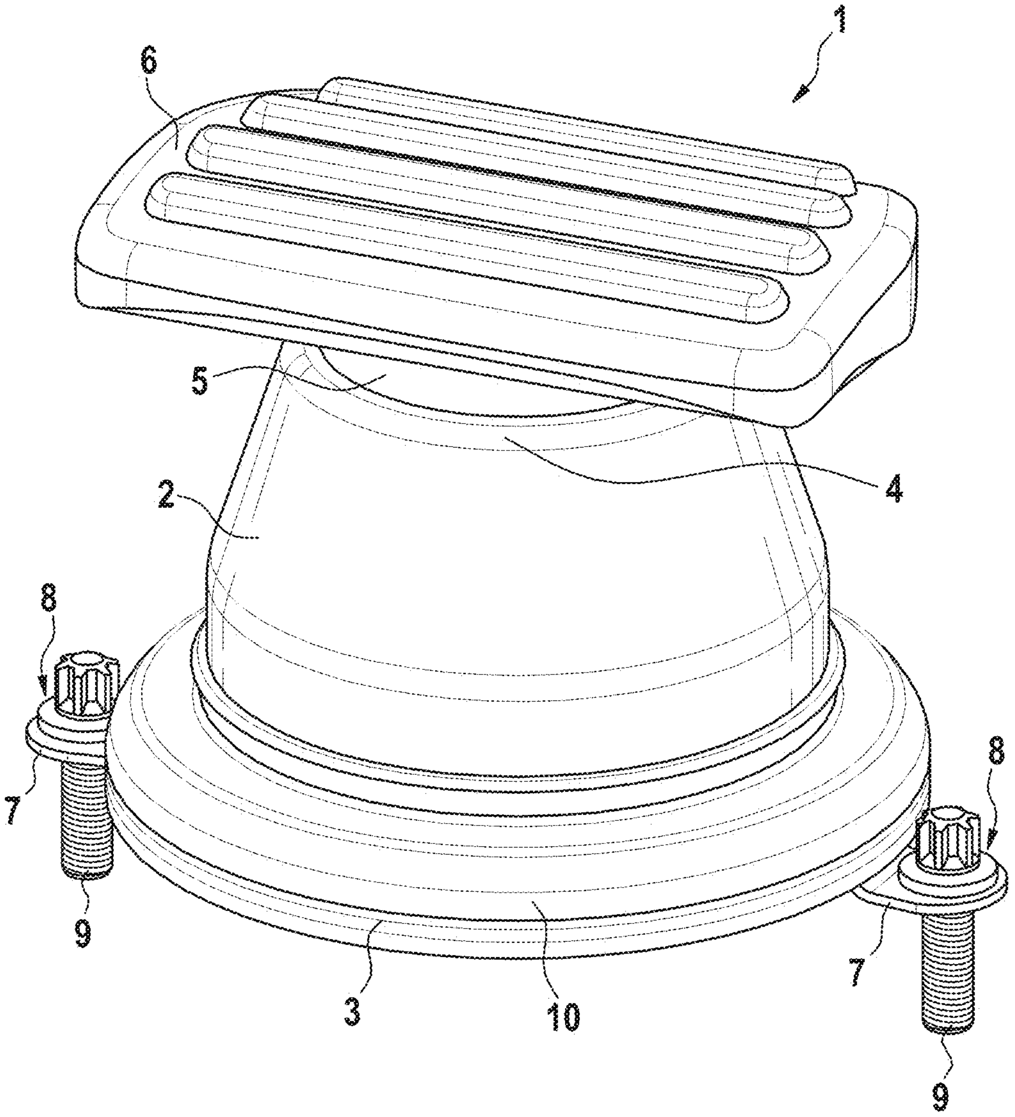
FIG. 1 an advantageous actuation device.

FIG. 1 shows an exemplary embodiment of an actuation device 1 for a motor vehicle not shown. The actuation device 1 is designed to indicate a braking request and/or an acceleration request. For this purpose, the actuation device 1 can be operated by a driver of the motor vehicle by foot, i.e. it is designed as a brake pedal, accelerator pedal and/or accelerator. This is an actuation device with a short stroke, for which only small displacements in the region of a few millimeters can usually be achieved.

The actuation device 1 comprises a first housing portion 2 and a second housing portion 3. The first housing portion 2 is displaceably mounted on the second housing portion 3 in the longitudinal extension of the second housing portion 3. In the present case, a cover 5 having an actuating surface 6 which can be actuated by the driver is arranged on a top surface 4 of the first housing portion 2 that faces away from the second housing portion 3.

The cover 5 can be designed as a single piece or, as shown here, as several pieces, wherein the individual parts are interconnected in an interlocking manner, for example. According to a non-represented exemplary embodiment, the cover 5 with the actuating surface 6 is alternatively arranged directly on the top surface 4.

The second housing portion 3 has a plurality of flanges 7, in particular flanges which are formed integrally with the second housing portion 3 or are connected thereto, which flanges each have an opening 8 for a fastening mechanism 9, which, in the present case, merely by way of example, is formed as a screw. The second housing portion 3 can be fastened by the fastening mechanism 9 in a footwell of an interior of the motor vehicle, so that the second housing portion 3 is arranged in a stationary position in relation to the motor vehicle.

A circumferential, in this case bellows-like, elastically deformable sealing element 10 for sealing against a region outside the housing portions 2, 3 is arranged between the first housing portion 2 and the second housing portion 3. According to an alternative, non-illustrated exemplary embodiment, the sealing element 10 is in full-surface contact with the first housing portion 2 and covers it completely.

Figure 2:
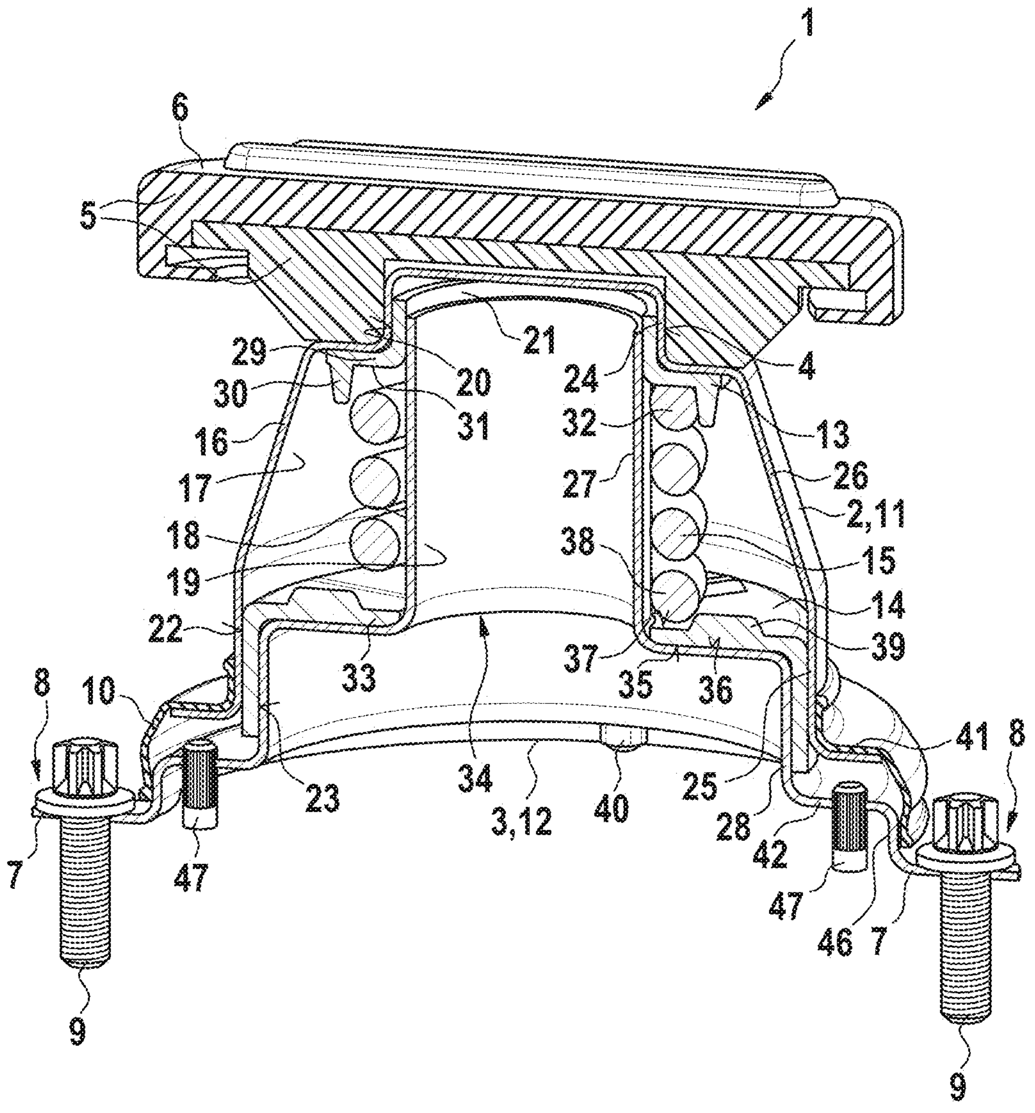
FIG. 2 the actuation device in a sectional view.

FIG. 2 shows the actuation device 1 in a sectional view. In FIG. 2, the components already described and their arrangement in relation to one another can be more clearly seen. The first housing portion 2 and the second housing portion 3 are each designed to be cylindrical, at least in sections, with a closed casing wall. The first housing portion 2 has a first thin-walled casing wall 11 and the second housing portion 3 has a second thin-walled casing wall 12, which each have an at least substantially constant wall thickness, in particular at least approximately the same wall thickness.

In the present case, the first casing wall 11 merges into the surface 4, so that the first housing portion 2 has a closed end side, whereas the second housing portion 3 is open at the end. The two housing portions 2, 3 only have a constant cross section in certain areas or sections. For example, the housing portions 2, 3 are formed as plastic portions or metal portions. The housing portions 2, 3 are formed in particular as deep-drawn sheets, turned, drawn or extruded aluminum profiles, or as injection-molded plastic portions.

A first sliding element 13 and a second sliding element 14 are arranged between the first housing portion 2 and the second housing portion 3, in this case between the first casing wall 11 and the second casing wall 12. The first sliding element 13 and the second sliding element 14 each bear axially against at least one of the housing portions 2, 3. The sliding elements 13, 14 are designed in particular as plastic plain bearings with a low coefficient of friction or as sintered metal bushes.

Between the sliding elements 13, 14, at least one spring element 15, in the present case designed as a coil spring, is arranged as a return spring axially, in the present case coaxially with the housing portions 2, 3, pretensioned in order to urge the housing portions 2, 3 into an unactuated rest position. In the present case, the spring element 15 is designed as a single coil spring.

According to alternative, non-represented exemplary embodiments, it is also possible to use several spring elements connected in series, or to use one or several disk springs or similar spring elements. It is also conceivable to use one or more, preferably cylindrical, elastomers or any combination of different spring elements, in particular coil springs, disk springs and/or elastomers.

In this case, one of the sliding elements 13, 14, in this case the first sliding element 13, is displaceable along the longitudinal extension of the second housing portion 3 together with the first housing portion 2 relative to the second housing portion 3. One of the sliding elements 13, 14, in this case the second sliding element 14, is arranged in a stationary position on the second housing portion 3. The first housing portion 2 is correspondingly displaceable along the longitudinal extension of the second housing portion 3 relative to the second sliding element 14.

The sliding elements 13, 14 thus perform an advantageous dual function. On the one hand, they ensure that the housing portions 2, 3 are displaceable relative to each other with little friction, and on the other hand, they securely fix the spring element 15 in its position.

The first housing portion 2 has an outer side 16, on which the surface 4 is also located, and an inner side 17 facing away from the outer side 16. Similarly, the second housing portion 3 has an outer side 18 facing the inner side 17 and an inner side 19 facing away from the outer side 18.

The first sliding element 13 has a first, outer surface 20 and an inner surface 21 facing away from the first surface 20. Similarly, the second sliding element 14 has a first, outer surface 22 and an inner surface 23 facing away from the first surface 22.

The first sliding element 13 is in contact with the first surface 20 on the inner side 17 of the first housing portion 2 and with the second surface 21 on the outer side 18 of the second housing portion 3. The second sliding element 14, in turn, is in contact with the inner side 17 via the first surface 22 and with the outer side 18 via the second surface 23.

In the present case, the first housing portion 2 has, along its longitudinal extension, not only cylindrical sections but also a conical section. This means that, in the present case, it has, along its longitudinal extension, at least one region in which its cross-sectional area or diameter is not constant but varies continuously.

In this case, it has a first constant inner diameter in a first region 24 assigned to the first sliding element 13 and a second constant inner diameter, which is greater than the first inner diameter, in a second region 25 assigned to the second sliding element 14.

For example, the second inner diameter is at least exactly twice the size of the first inner diameter. The two regions 24, 25 are therefore cylindrical in shape.

This applies analogously for the corresponding outer diameters, the first housing portion 2 has in this respect in the first region 24 a first constant outer diameter and in the second region 25 a second constant outer diameter which is greater than the first outer diameter.

The first region 24 is arranged in a longitudinal extension at a first end, in the region of the surface 4, and the second region 25 is arranged at the second end, facing away from the first end, of the first housing portion 2. The conical shape is created by the first region 24 and the second region 25 being connected by a third region 26, in which the first inner diameter and outer diameter expand continuously to form the second inner diameter and outer diameter. The three regions 24, 25, 26 are thus part of the casing wall 11, or at least form it in some regions.

According to an alternative, non-illustrative exemplary embodiment, the third region 26 has a constant inner diameter and/or outer diameter, in particular the same inner diameter and/or outer diameter as one the other two regions 24, 25, so that the first housing portion 2 is then not of overall conical design, but consists of at least two or three cylindrical sections.

In terms of its basic geometric shape, it would then correspond to the second housing portion 3. In the present case, this has several such cylindrical sections that are arranged in a row, interconnected or formed integrally with one another.

Thus, the second housing portion 3 has, in a first region 27 associated with the first sliding element 13, a first constant inner diameter and a first constant outer diameter, and, in a second region 28 associated with the second sliding element 14, a second constant inner diameter and a second constant outer diameter, wherein the second inner diameter and outer diameter are each larger than the first inner diameter and outer diameter. Here too, the regions 27, 28 are similarly part of the casing wall 12 or at least form it in some regions.

The sliding elements 13, 14 are designed to correspond geometrically to the guide elements in that they are each at least essentially cylindrical in shape or each have at least one correspondingly cylindrical section. At least in this portion, they have an outer diameter corresponding to the respective inner diameter of the first housing portion 2 and/or an inner diameter corresponding to the respective outer diameter of the second housing portion 3.

For example, the first sliding element 13 is arranged in the first region 24 in an interlocking, force-fitting and/or materially bonding manner, in particular it is pressed in, so that it does not displace relative to the first housing portion 2, and/or the second sliding element 14 is arranged in an interlocking, force-fit and/or materially bonded manner on the second region 28, in particular pressed on, so that it does not displace relative to the second housing portion 3.

The spring element 15 is arranged in the present case so as to surround the first region 27, is thereby radially fixed and accordingly has an inner diameter which corresponds to the first outer diameter of the second housing portion 3, that is to say is at least as large as or larger than the first outer diameter.

In order to also secure the spring element 15 axially between the sliding elements 13, 14, the first sliding element 13 has a circumferential radial protrusion 29 at an end assigned to the spring element 15. At least one axial protrusion 30, in particular also circumferential, adjoins the protrusion 29. The spring element 15 abuts, at least in certain regions, against a surface 31, facing the second sliding element 14, of the radial protrusion 29, by way of a first end 32, and is thus fixed axially. It is additionally fixed radially by the protrusion 29 between the protrusion 29 and the outer side 18 of the second housing portion 3.

In order to axially secure the spring element 15 in another way, the second sliding element 14 has an end side 33 having an opening 34 with a diameter corresponding to the first outer diameter for the first region 27 of the second housing portion 3. The second sliding element 14 is pushed onto the second housing portion 3 until an inner surface 35 of the end side 33 and an outer surface 36 of the outer side 18, which is aligned in the radial extension of the second housing portion 3, touch.

The spring element now abuts, at least in certain regions, against a surface 37 of the end side 33 facing the first sliding element 13 and facing away from the inner surface 35, by way of a second end 38 facing away from the first end 32, and is thus axially fixed. The second sliding element 14 additionally has axial protrusions 39 that protrude from the surface 37, by way of which the second end 38 is additionally radially fixed between the respective protrusion 39 and the outer side 18 of the second housing portion, analogously to the protrusion 30 of the first sliding element 13.

Furthermore, at least one first pin 40 is arranged on the first housing portion 2 as an anti-rotation device. This is shown in a first detailed view of FIG. 3A, which shows a further sectional view in a sectional plane arranged approximately at right angles to the sectional plane of FIG. 2.

The first housing portion 2 has a circumferential radial protrusion 41 adjoining the second region 25. The first pin 40 is arranged on the protrusion 41 and projects in the direction of the second housing portion 3. In particular, the first pin 40 is arranged in an opening of the protrusion 41. The second housing portion 3 has a circumferential radial protrusion 42 that is adjacent to the second region 28. A first opening 43 is provided in the protrusion 42, which corresponds to an outer contour of the pin 40, and into which the pin 40 is inserted.

At the first pin 40, at its end region 44 facing away from the first housing portion 2, there is an axial stop 45, in the present case in the form of a press sleeve circumferentially surrounding the pin, for limiting a stroke of the housing portions 2, 3 relative to each other. The axial stop 45 is mounted when the first pin 40 is inserted through the opening 43, and in this respect also advantageously ensures that the housing portions 2, 3 are held captive to one another. The first pin 40 also defines a pretensioning of the spring element 15, or rather the pretensioning is set as a function\ of its length.

Figure 3A:
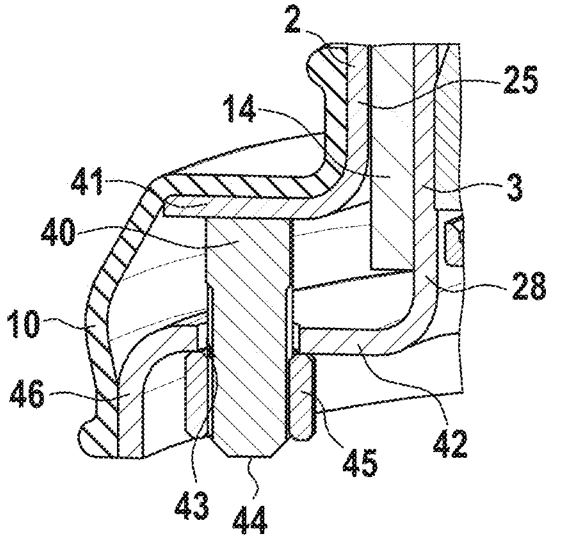
FIG. 3A a first detailed view of the actuation device.

With regard to the sealing element 10, it can still be clearly seen in FIG. 3A, in particular, that this rests against the respective outer sides of the housing portions 2, 3 in order to seal the region in which the first pin 40 is located and thus to seal the interior of the housing portions 2, 3 as a whole. Specifically, the sealing element 10 abuts against the second region 25 and against the protrusion 41 of the first housing portion 2, as well as against a further axial circumferential protrusion 46, adjoining the radial protrusion 42, of the second housing portion 3. The already described radially extending flanges 7 then adjoin the protrusion 46. The sealing element 10 thus abuts in certain areas against a circumferential radial or axial protrusion 41, 46 of the respective housing portion 2, 3.

Figure 3B:
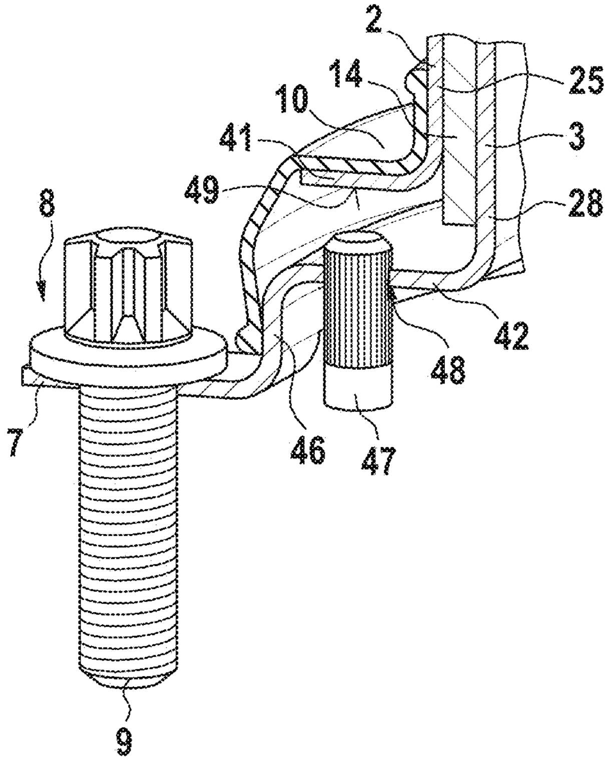
FIG. 3B a second detailed view of the actuation device.

At least one second pin 47 for adjusting a stroke of the housing portions 2, 3 relative to each other is finally arranged on the second housing portion 3. In the present case, at least two second pins 47 are provided. This is shown in a second detailed view of FIG. 3B, which shows an enlarged section of FIG. 2 in the lower left region.

It can be seen that the second pin 47 is arranged in a second opening 48 of the already described circumferential radial protrusion 42. It projects in the direction of the first housing portion 2, specifically in the direction of the protrusion 41. For example, the pin 47 is pressed into the opening 48; in the present case, it also has a corrugation along the longitudinal extension.

Depending on how far the pin 47 is inserted into the opening 48 or how far it protrudes in the direction of the protrusion 41, the maximum stroke results from when the end of the pin 47 strikes a surface 49 of the protrusion 41 facing it.

In this case, each of the pins 40, 47 is connected to the corresponding housing portion 2, 3 in an interlocking, force-fit and/or materially bonded manner, in particular by adhesive bonding, welding, and/or by being pressed and/or screwed into the corresponding opening 43, 48. Alternatively, at least one of the pins 40, 47 is formed in one piece with the corresponding housing portion 2, 3.

In particular, at least one of the pins 40, 47 is coated and/or the opening 43, 48 associated with it is provided with a noise-damping element. Alternatively or additionally, an elastic buffer element, for example a plastic disc, is provided as a noise-damping measure, in particular on the axial stop.

Figure 4:
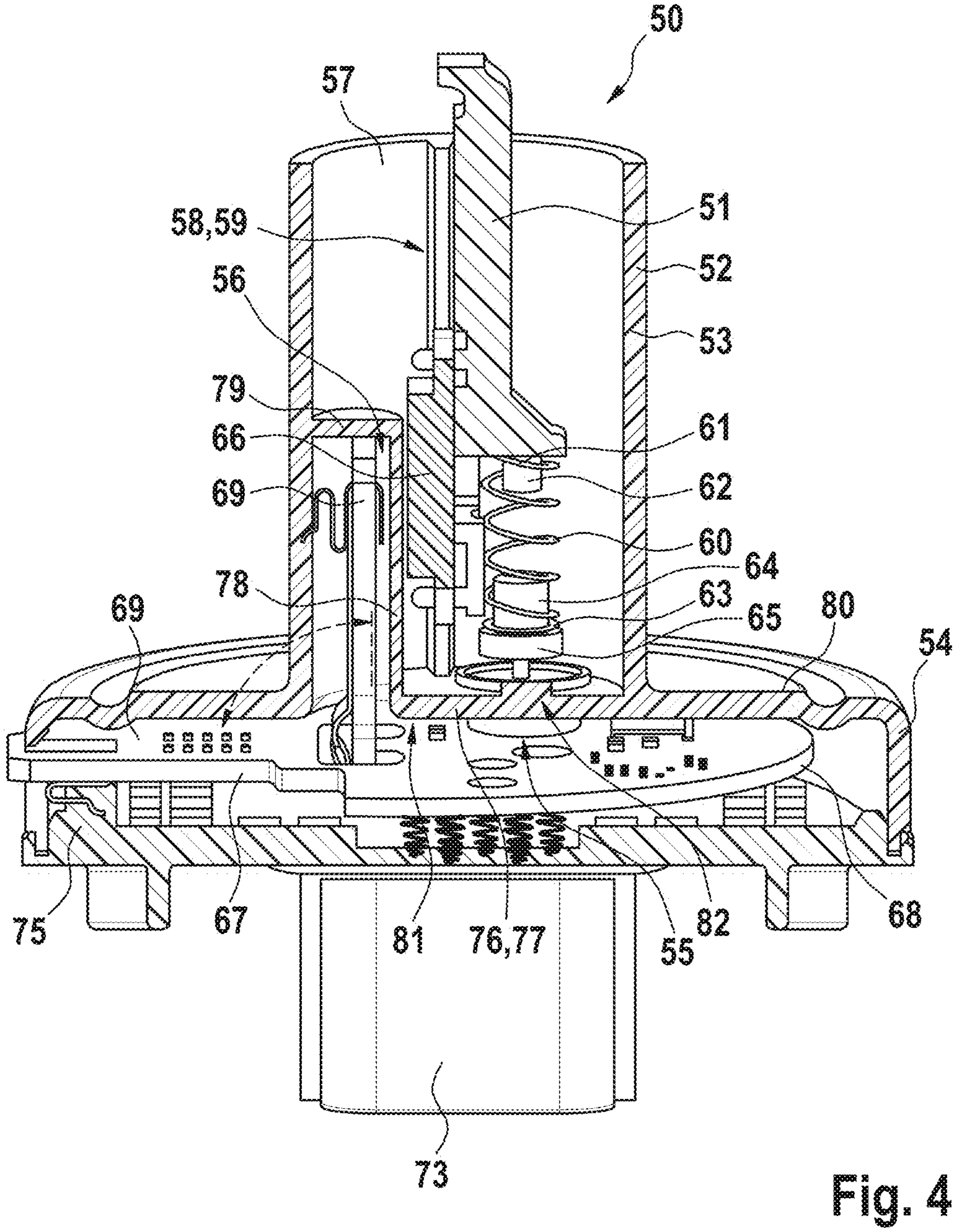
FIG. 4 a sensor module for the actuation device in a sectional view.

The components of the actuation device 1 described so far are purely mechanical or a kind of mechanical module of the actuation device 1. However, it can be seen in FIG. 2 that the interior of the second housing portion 3 forms a cavity. To fill this cavity, a sensor module 50 is provided, which is shown in FIG. 4 as an exemplary embodiment in detail in a sectional view.

The sensor module 50 can be arranged in a precisely fitting manner in the second housing portion 3 and is designed to detect an actuation of the actuation device 1, in particular an actuating force exerted on the actuating surface 6 and/or an actuation path of the actuating surface 6.

The sensor module 50 has a plate-shaped sensor element 51, in particular made of metal or plastic. The sensor element 51 can be or is assigned to an actuating element of the actuation device 1. The actuating element is in particular the actuating surface 6 or the first housing portion 2 connected thereto.

The sensor module 50 further comprises a sensor housing 52. The sensor housing 52 has a first cylindrical housing portion 53 and an adjoining, i.e. connected, second cylindrical housing portion 54, which is formed integrally therewith. The housing portions 53, 54 have identical, at least largely constant wall thicknesses. The inner diameter and outer diameter of the first housing portion 53 are smaller than the inner diameter and outer diameter of the second housing portion 54.

Furthermore, the sensor module 50 in the present case has at least one force sensor element 55 associated with the sensor element 51 for detecting a force exerted on the sensor element 51, in particular by way of the actuating element, and at least one displacement sensor element 56 associated with the sensor element 51 for detecting a displacement of the sensor element 51. The force sensor element 55 comprises in particular strain gauges and is in particular configured as described in the previously known prior art of the applicant mentioned at the beginning.

In order for the sensor module 50 to function as presented, it is sufficient if either the force sensor element 55 or the displacement sensor element 56 is present, wherein, if both are present, an advantageous redundancy arises due to the different measuring principles. In particular, at least two force sensor elements 55 and/or displacement sensor elements 56 are provided in each case in order to further improve the reliability of the measurement and the redundancy.

In this way, such redundancy in particular fulfills corresponding standards and/or laws in order to meet quality/safety requirements. For example, two different measuring principles are prescribed for brake pedals, and these are each redundant in order to be ASIL-D capable. For accelerator pedals, two redundant sensors with the same measuring principle are sufficient.

If one sensor fails or drifts, it must be ensured that the remaining sensors are still able to detect the “true” signal of the driver’s intention. If a sensor fails, a warning message is issued to the driver, for example. An entire circuit can fail, in which case two sensors would be affected on the brake pedal and one sensor on the accelerator pedal. In this case, the respective redundant sensors take over the detection of the driver’s intention, preferably combined with a warning message to the driver.

The sensor element 51 is mounted in the first housing portion 53 so as to be longitudinally displaceable. For this purpose, the first housing portion 53 has on its inner side 57 at least one groove 58 and/or one web 59 running along its longitudinal extension, in particular at least two the inner side 57, for example, diametrically opposed grooves 58 and/or ridges 59, in and/or on which the sensor element 51 is guided.

For this purpose, the sensor element 51 is assigned to a respective longitudinal side of the respective groove 58 or the web 59, in particular inserted into the respective groove 58 or placed on the respective web 59. For this purpose, the sensor element 51 preferably has, on the longitudinal side, a groove with an inner contour corresponding to the respective outer contour of the web 59. The sensor element 51 is guided in or on the groove 58 or the web 59 in particular in a manner that is at least approximately free of play or subject to play.

The sensor module 50 further comprises at least one first spring element 60, which is designed as a coil spring in this case. According to alternative, non-represented exemplary embodiments, it is also possible to use several spring elements connected in series, or to use one or several disk springs or similar spring elements. It is also conceivable to use one or more, preferably cylindrical, elastomers or any combination of different spring elements, in particular coil springs, disk springs and/or elastomers.

The sensor element 51 is operatively connected to the force sensor element 55 by way of the first spring element 60. According to an alternative, non-represented exemplary embodiment, in which no force sensor element 55 is present, the sensor element 51 can be supported on the sensor housing 52 by way of the first spring element 60. In the present case, the sensor element 51 also projects from the first housing portion 53 at least in an unactuated rest position of the spring element 60, that is to say in the assembled state in the direction of the actuating element of the actuation device 1.

The first spring element 60 is pushed, at least in certain regions, onto a protrusion 62 of the sensor element 51 by way of a first end 61 and, at least in certain regions, onto a protrusion 64 of a further sensor element 65, which is operatively connected to the force sensor element 55, by way of a second end 63 facing away from the first end 61.

A sensor element 51 is assigned a transmitter element 66, in this case a magnet element, which is assigned a displacement sensor element 56, in this case a Hall sensor. For example, a magnetic element in the form of a permanent magnet is provided, which is arranged on a longitudinal side of the sensor element 51 and is connected thereto, in particular in an in an interlocking, force-fit and/or materially bonded manner. The displacement sensor element 56 is then based on a magnetic measuring principle. Alternatively, other measuring principles, in particular optical ones, are provided for the displacement sensor element 56.

The displacement sensor element 56 and the force sensor element 55 are arranged on a common printed circuit board 67 arranged in the sensor housing 52. According to a further, non-represented exemplary embodiment, the displacement sensor element 56 and the force sensor element 55 are each arranged on a printed circuit board arranged in the sensor housing 52.

The common printed circuit board 67 has a first portion 68 with the force sensor element 55 and a second portion 69 with the displacement sensor element 56. The second portion 69 is angled at least approximately at right angles to the first portion 67.

In their original form, the two portions 68, 69 of the printed circuit board 67 lie in a common plane, and only before assembly in the sensor housing 52 is the second portion 69 bent correspondingly. In FIG. 4, both states (flat and bent) and the mobility are indicated by a dashed double arrow.

According to an alternative, non-represented exemplary embodiment, a first printed circuit board with the force sensor element 55 is provided, which is arranged, in particular at least approximately at right angles, at an angle to a second printed circuit board with the displacement sensor element 56 and is electrically connected to the second printed circuit board.

The first portion 68 of the printed circuit board 67 (or, alternatively, the corresponding first printed circuit board) is arranged within the second housing portion 54 and the second portion 69 of the printed circuit board 67 (or, alternatively, the corresponding second printed circuit board) is arranged within the first housing portion 53. The second portion 69 then extends parallel to the longitudinal extension of the sensor element 51, and the first portion 68 extends perpendicular to the longitudinal extension of the sensor element 51.

Figure 5A:
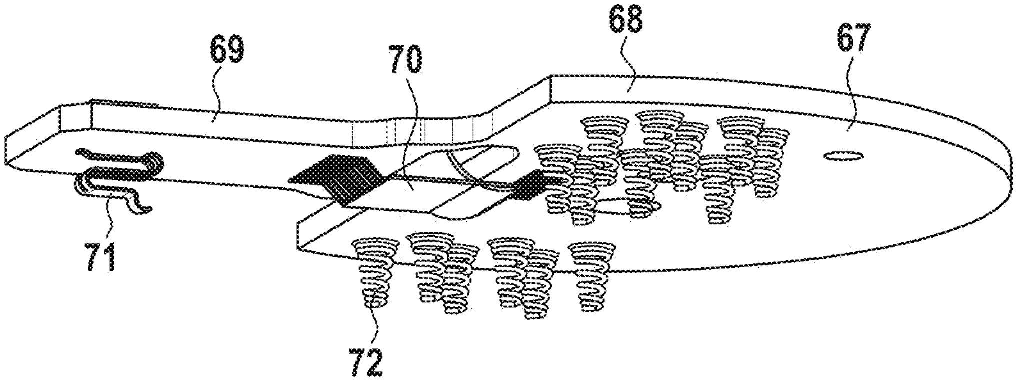
FIG. 5A a first detail view of the sensor module.

FIG. 5 shows a detailed view of the printed circuit board 67 in its original state, i.e. without the portions being angled with respect to each other. The two portions 68, 69 are electrically interconnected by an electrical flexible connection 70, which in the present case has several wires, so that in particular the force sensor element 55 and the displacement sensor element 56 arranged on it can be connected or are connected to an external power supply and/or a communication bus.

Furthermore, a further six spring elements are arranged on the circuit board 67, in each case on the side of the circuit board 67 facing away from the sensor element 51 and the displacement sensor element 56 and the force sensor element 55.

On the one hand, at least one second spring element 71 for supporting the printed circuit board 67 is arranged on the sensor housing 52, in the second portion 69 in the present case (or, alternatively, on the corresponding second printed circuit board). The second spring element 71 ensures that the displacement sensor element 56 is at a defined distance from the transmitter element 66. In the assembled state, it is supported on the inner side 57 in the first housing portion 53.

Figure 5B:
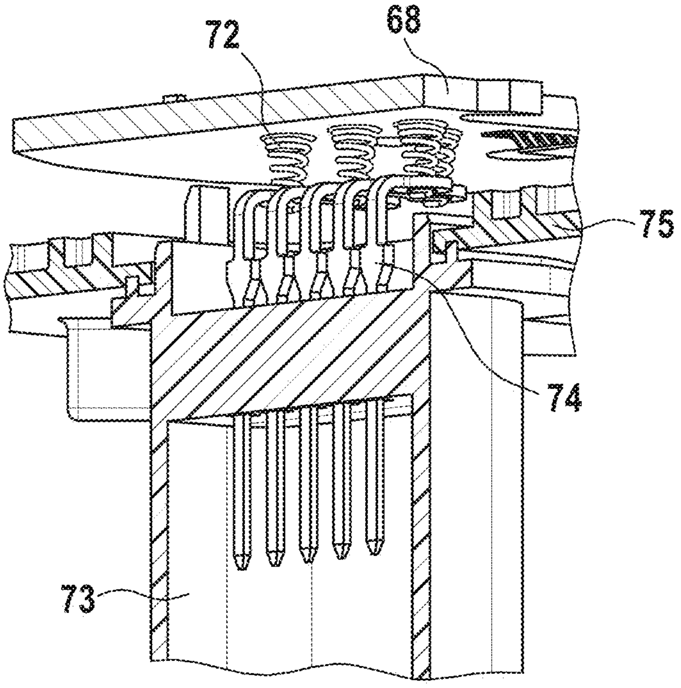
FIG. 5B a second detail view of the sensor module.

On the other hand, a multiplicity of third spring elements 72 (of which, for reasons of clarity, only one is provided with a reference numeral) is arranged for making electrical contact with the printed circuit board, with a connector 73, in the first portion 68 (or, alternatively, on the corresponding first printed circuit board). This is shown in FIG. 5B in a second detailed view, where the connector 73, which has a plurality of connection pins 74, is shown. Each of the connection pins 74 is in contact with one of the third spring elements 73.

The connector 73 is in turn inserted into a housing cover 75, which can also be seen in FIG. 4, and which is used to close the sensor housing 52 as soon as the printed circuit board 67 is inserted into the sensor housing 52.

A housing wall 76 comprising several sections is also provided inside the sensor housing 52. In the present case, the housing wall 76 is designed in one piece with the sensor housing 52. A first portion 77 of the housing wall 76 extends at least substantially perpendicular to the longitudinal extension of the sensor element 51 and parallel to the longitudinal extension of the housing cover 75 and, in the mounted state, of the first portion 68 of the printed circuit board 67.

The first portion 77 is adjoined by a second portion 78, which is aligned at a right angle thereto and which, accordingly, extends at least essentially parallel to the longitudinal extension of the sensor element 51 or, in the mounted state, parallel to the second portion 69 of the printed circuit board 67. A third portion 79, which is oriented at right angles to the second portion 78, runs at a corresponding distance parallel to the first portion 77. The housing wall 76 thus forms, together with an outer wall of the sensor housing 52, a receiving pocket for the second portion 69 of the printed circuit board 67.

The first portion 77 extends exactly between the two housing portions 53, 54, or at the level of and parallel to an end side 80 of the second housing portion 54, which has an opening 81 from which the first housing portion 53 projects.

In this respect, the first portion 77 fills the opening 81 again in sections. The second portion 78 and the third portion 79 are arranged correspondingly within the first housing portion 53.

The housing wall 76 has an opening 82 for the further sensor element 63 only in the first portion 77 and is otherwise formed without openings (if several force sensor elements 55 with corresponding sensor elements 63 are provided, then preferably a separate opening is also provided for each of these). In this respect, the printed circuit board 67 is completely separated from the sensor element 51, preferably in a media-tight manner.

Figure 6:
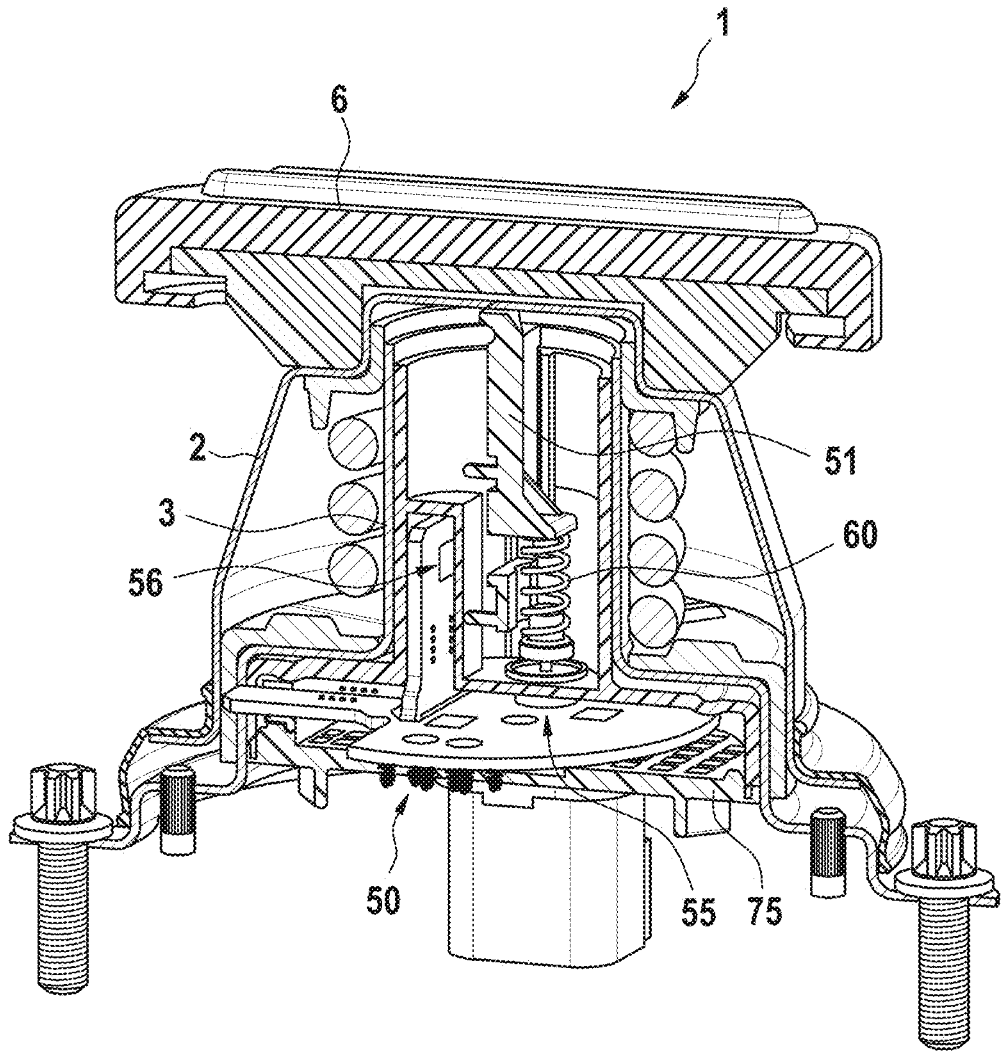
FIG. 6 the actuation device with the sensor module in a further sectional view.

Finally, FIG. 6 shows the fully assembled actuation device 1 together with the sensor module 50. For reasons of clarity, only the most important components are provided with reference numerals. The sensor module 50 is now inserted into the second housing portion 3 and closed with the housing cover 75.

The sensor element 51 abuts against the inner side of the first housing portion 2 connected to the actuating surface 6 by way of the pretensioning of the spring element 60, so that each actuation of the actuating surface 6 is transmitted by way of the sensor element 51 to the displacement sensor element 56 and the spring element 60 and then to the force sensor element 55 and the displacement sensor element 56.

What is claimed is:

1. An actuation device for a motor vehicle for specifying a braking and/or acceleration request, comprising:

a first housing portion and a second housing portion, wherein the first housing portion is displaceably mounted on the second housing portion in a longitudinal extension of the second housing portion, and wherein the first housing portion has an actuating surface on a top surface facing away from the second housing portion, or wherein a cover having an actuating surface is arranged on a top surface facing away from the second housing portion, and wherein the first housing portion and the second housing portion are each formed at least in sections in a cylindrical shape with a closed casing wall;

a first sliding element and a second sliding element arranged between the first housing portion and the second housing portion, wherein the first sliding element and the second sliding element each abut axially against at least one of the first housing portion and the second housing portion; and at least one spring element arranged between the first sliding element and the second sliding element as a return spring, which is pretensioned coaxially with the first housing portion and the second housing portion in order to urge the first housing portion and the second housing portion into an unactuated rest position.

2. The actuation device according to claim 1, wherein:

the first sliding element is configured to be displaceable along the longitudinal extension of the second housing portion together with the first housing portion relative to the second housing portion, and/or the second sliding element is arranged in a stationary position on the second housing portion and the first housing portion is displaceable along the longitudinal extension of the second housing portion relative to the second sliding element.

3. The actuation device according to claim 1, wherein the first sliding element abuts against an inner side of the first housing portion by way of a first surface and/or abuts against an outer side of the second housing portion by way of a second surface facing away from the first surface.

4. The actuation device according to claim 1, wherein the first housing portion has (i) a first inner diameter in a first region associated with the first sliding element, and (ii) a second inner diameter, which is greater than the first inner diameter, in a second region associated with the second sliding element.

5. The actuation device according to claim 1, wherein the second housing portion has (i) a first outer diameter in a first region associated with the first sliding element, and (ii) a second outer diameter, which is greater than the first outer diameter, in a second region associated with the second sliding element.

6. The actuation device according to claim 4, wherein the first sliding element and the second sliding element are each designed to be at least essentially cylindrical and have an outer diameter corresponding to the respective inner diameter of the first housing portion and/or an inner diameter corresponding to the respective outer diameter of the second housing portion.

7. The actuation device according to claim 5, wherein the spring element is designed as a coil spring and has an inner diameter corresponding to the first outer diameter.

8. The actuation device according to claim 1, wherein:

the first sliding element has a circumferential radial protrusion, and the spring element abuts, at least in certain regions, against a surface of the protrusion facing the second sliding element by way of a first end, and/or the second sliding element has an end side having an opening with a diameter corresponding to the first outer diameter for the first region of the second housing portion, and the spring element abuts, at least in certain regions, against a surface of the end side facing the first sliding element by way of a second end facing away from the first end.

9. The actuation device according to claim 1, further comprising at least one first pin arranged in an opening of the first housing portion and protruding in the direction of the second housing portion, and arranged on a circumferential radial protrusion of the first housing portion as an anti-rotation device, and wherein the first pin is introduced into an opening arranged in a circumferential radial protrusion, corresponding to its outer contour, of the second housing portion.

10. The actuation device according to claim 9, wherein:

the first pin is arranged in an opening in the second housing portion, and on the first pin, on its end region facing away from the first housing portion, a press sleeve surrounding the first pin circumferentially, is arranged for limiting a stroke of the first housing portion and the second housing portion relative to each other and/or for adjusting a pretensioning of the spring element.

11. The actuation device according to claim 1, further comprising at least one second pin arranged in an opening in the second housing portion and protruding in the direction of the first housing portion, and arranged on a circumferential radial protrusion of the second housing portion for adjusting a stroke of the first housing portion and the second housing portion relative to each other.

12. The actuation device according to claim 9, wherein at least one of the first pin and the second pin is formed in an interlocking, force-fit, and/or materially bonded manner in one piece with the corresponding housing portion or is connected to the corresponding housing.

13. The actuation device according to claim 1, further comprising a circumferential sealing element arranged between the first housing portion and the second housing portion for sealing against a region outside each housing.

14. The actuation device according to claim 1, further comprising a sensor module configured to detect an actuating force exerted on the actuating surface and/or an actuation path of the actuating surface, wherein the sensor module is arranged in the second housing portion.

15. A motor vehicle comprising at least one actuation device according to claim 1.

16. The actuation device according to claim 1, wherein the at least one spring element includes at least one coil spring.

17. The actuation device according to claim 9, wherein at least one of the first pin and the second pin is formed in an interlocking, force-fit, and/or materially bonded manner in one piece with the corresponding housing portion, or is glued, welded, and/or pressed and/or screwed into a corresponding opening.

18. The actuation device according to claim 1, further comprising a circumferential sealing element arranged between the first housing portion and the second housing portion for sealing in each case against regions on a circumferential radial or axial protrusion of the respective housing portion.

* * * * *